United States Patent [19]

Calvert

[11] 4,356,009
[45] Oct. 26, 1982

[54] GAS SCRUBBER AND RELATED METHOD

[75] Inventor: Seymour Calvert, San Diego, Calif.

[73] Assignee: Air Pollution Technology, Inc., San Diego, Calif.

[21] Appl. No.: 277,025

[22] Filed: Jun. 24, 1981

[51] Int. Cl.$^3$ ...................... B01D 47/02; B01D 47/06; B01D 47/12

[52] U.S. Cl. .......................................... 55/90; 55/93; 55/95; 55/223; 55/241; 55/248; 55/416; 261/21 261/78 A; 261/111; 261/DIG. 54

[58] Field of Search ............................ 55/85, 93–95, 55/223, 226, 240, 241, 245, 248, 257 R, 416, 90; 261/17, 21 R, 78 A, 108–111, DIG. 9, DIG. 54

[56] References Cited

U.S. PATENT DOCUMENTS

| 415,093 | 11/1889 | Corcoran | 55/248 |
| 636,256 | 11/1899 | Gates | 55/257 R |
| 1,691,971 | 11/1928 | Hansard et al. | 55/223 |
| 3,140,163 | 7/1964 | Hausberg | 55/416 |
| 3,332,214 | 7/1967 | Huppke | 55/223 |
| 3,350,076 | 10/1967 | Crommelin, Jr. | 261/DIG. 54 |
| 3,673,769 | 7/1972 | Gleason | 55/223 |
| 3,722,839 | 3/1973 | Erickson et al. | 55/416 |
| 4,082,522 | 4/1978 | Koga | 55/240 |
| 4,164,398 | 8/1979 | Caesar | 55/226 |
| 4,253,853 | 3/1981 | Caesar | 55/226 |

Primary Examiner—David L. Lacey

Attorney, Agent, or Firm—Richard H. Zaitlen

[57] ABSTRACT

A scrubber device for removing finely divided contaminants including gases from a gas stream is disclosed. The device comprises a housing defining a pretreatment section, an implosion section, and a diffusion section. The pretreatment section includes an inlet for directing a gas stream therein and means which define an annular flow path between the pretreatment section and the implosion section for the gas stream. The implosion section is disposed in the housing and is configured such that as the gas stream flows through the annular passage, it is directed radially inward. Means for supplying a liquid to the implosion section is also included, such that as the gas stream passes through the implosion section, finely divided liquid particles are entrained in the gas stream. The diffusion section is configured to receive the gas stream from the implosion section and includes means for removing the finely divided liquid particles. The now clean gas stream is then directed out of the diffusion section. The associated method comprises using the scrubber device previously described and directing a stream of gas through it such that finely divided contaminants are removed by various mechanisms. By the use of the scrubber device and related method of the present invention, even finely divided contaminants in the order of micron or submicron size diameters can be removed.

21 Claims, 3 Drawing Figures

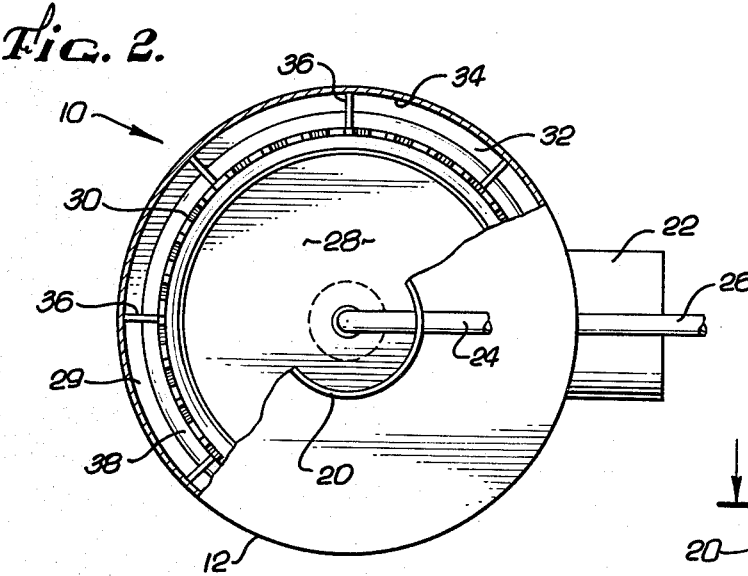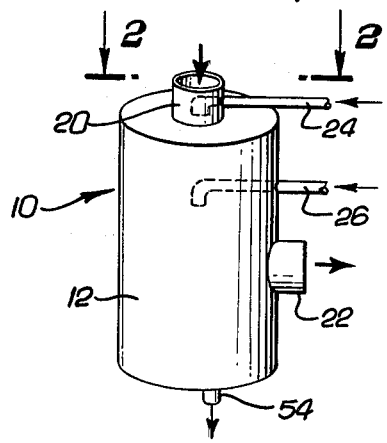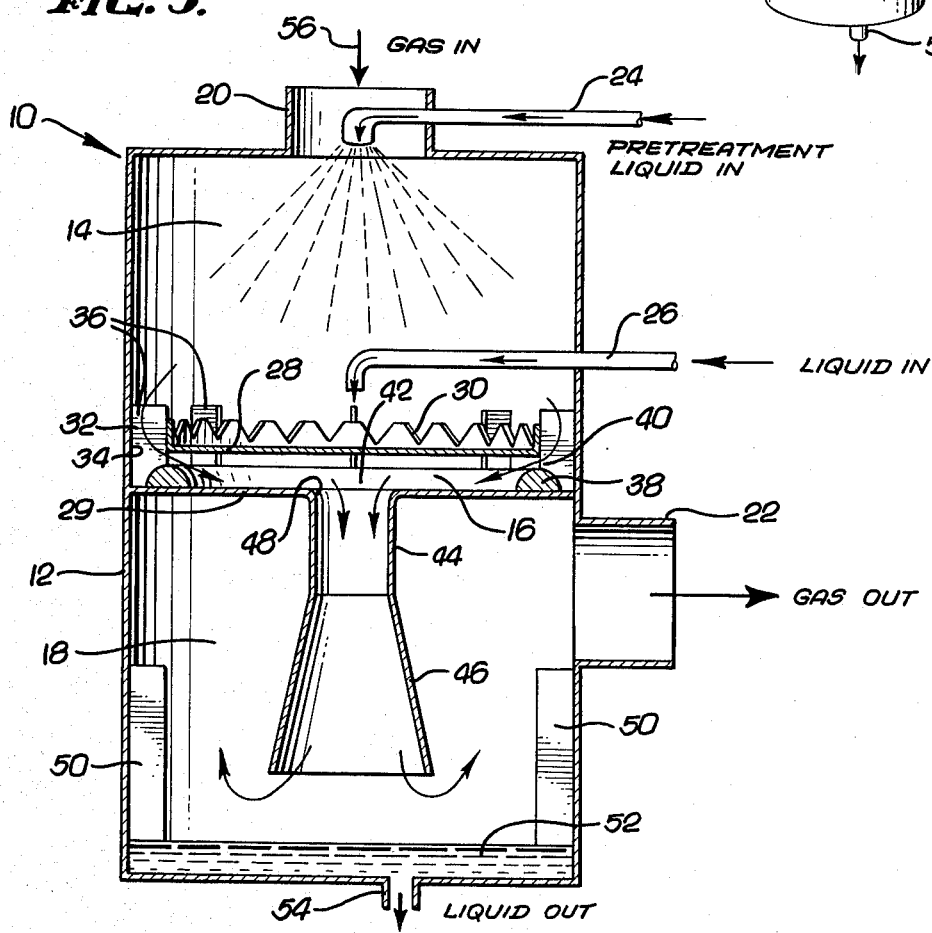

GAS SCRUBBER AND RELATED METHOD

BACKGROUND OF THE INVENTION

1. Field of the Invention

The present invention relates to particle scrubbers, and more specifically, to a scrubber device adapted to remove finely divided contaminants including gases from a gas stream.

2. Prior Art

Concern over the environment has been recognized as one of the most important problems facing today's society. In the past, many industries operated in such a manner so as release to the atmosphere hugh quantities of contaminants, such as, for example, gas contaminants and other small particulate materials. Many cities suffered the blight of having their atmospheres adversely affected by such contaminants. No only is this unsightly, but such contaminants are believed to be related to certain health problems. Most industries have recognized the responsibility to deal with the problem of pollution and have devised various means to control their effluent so as to remove many of the pollutants therefrom. In fact, an entire area of technology has evolved in connection with pollution control apparatus and related methods. While there are many prior art references which teach various techniques to deal with the various types of air and water pollution, it has been found that the smaller the particle in the fluid stream, the more difficult the removal. Thus, while there are a number of prior art devices, especially in connection with removing particulate matter from air, such devices have not proved to be as effective when the particulate matter is extremely small. Even with respect to those few devices which can remove very small particulate matter, such devices suffer from the shortcomings of being expensive and/or complex. In addition, such devices usually have high power requirements and tend to wear out quickly because of the abrasion and erosion caused by the action of the high velocity gas, liquid and particle streams.

As indicated hereinabove, a number of devices referred to as "scrubbers" are available for removing particulate matter. However, before selecting a specific scrubber, a number of considerations should be taken into account. For example, the basic mechanism for particle collection from a gas stream should be considered. These mechanisms include: (1) gravitational sedimentation (this mechanism is usually of little importance for any particle small enough to require consideration of a scrubber); (2) centrifugal deposition (particles are "spun out" of a gas stream by a centrifugal force induced by a changing gas flow direction. These mechanisms have been found to be not very effective on particles smaller than about 5.0 microns in diameter); and (3) inertial impaction and interception (when a gas stream flows around a small object, the inertia of the particles causes them to continue to move toward the object where some of them are collected. Inertial impaction customarily describes the effect of small-scale changes in flow direction). Because inerial impaction is effective on particles of extremely small diameters, it has been one of the more important collection mechanisms for particle scrubbers. Since this mechanism hinges on the inertia of the particles, both the size and density of the particles are important consideration in determining the ease with which they may be collected.

One of the most well known types of prior art scrubbers is a scrubber referred to as a "plate scrubber". A plate scrubber consists of a vertical tower with one or more plates mounted transversely inside. Gas comes in at the bottom of the tower and must pass through perforations, valves, slots, or other openings in each plate before leaving through the top. Usually, liquid is introduced through the top plate and flows successfully across each plate as it moves downward to the liquid exit at the bottom. The gas passes through the opening in each plate and mixes with the liquid flowing over it. Gas-liquid contacting causes the mass transfer or particle removal for which the scrubber was designed. With respect to plate scrubbers, the chief mechanism of particle collection is inertial impaction from the gas impinging on the liquid or on the solid member. Particle collection may be aided by atomization of the liquid flowing past openings in the perforated plates.

Yet another type of device is referred to as a "preformed-spray scrubber". A preformed-spray scrubber collects particles or gases on liquid drops that have been atomized by spray nozzles. The properties of the droplets are determined by the configuration of the nozzle, the liquid being atomized and the pressure to the nozzles. Sprays leaving the nozzles are directed into a chamber that has been shaped so as to conduct the gas through the atomized droplets. Horizontal and vertical gas flow paths have been used, as well as spray-entry flowing concurrent, counter current or cross flow to the gas. If the tower is vertical, the relative velocities between the droplets and the gas is ultimately the terminal settling velocity of the droplets.

Yet another type of scrubber is one referred to as a "gas-atomized" spray scrubber which uses a moving gas stream to first atomize liquid into droplets, and then accelerates the droplets. Typical of this type of device is a venturi scrubber. High gas velocities of 100-500 feet per second raise the relative velocity between the gas and liquid droplets, and promotes particle collection. Many gas-atomized spray scrubbers incorporate the conversion and diversion sections typical of the venturi scrubber, although increase in benefits is not necessarily achieved. Liquid can be introduced in various places and in different ways in such devices without much effect on collection efficiency. Particle collection results from inertial impaction due to gas flow around the droplets. Velocity is high and droplet residence time short such that diffusional collection and deposition by other forces, such as thermophoretic forces, are not very effective.

One distant improvement over the prior art is discussed and disclosed in my co-pending application Ser. No. 17,182 filed Mar. 5, 1979, now U.S. Pat. No. 4,266,951, which is herein incorporated by reference. There, a scrubber device is disclosed which utilizes specifically configured nozzles and flow guides such that a collision zone is created. Contaminants in each of the respective streams are removed by inertial impaction. By the use of such scrubber device, even finely divided contaminants of micron and sub-micron diameter can be removed.

The present invention represents an advancement in the art of air pollution control devices, and contains many distinct advantages, including ease of construction, simplicity yet high efficiency, not associated with many prior art devices. Thus, the present invention provides a relatively simple and straightforward solution to the removal of small particulate matter which would otherwise escape into the atmosphere.

BRIEF SUMMARY OF THE INVENTION

The present invention is directed to an apparatus and related method for cleaning a stream of gas. It is primarily directed to the removal of small particulate matter from the gas stream by means of wet scrubbing. The device of the present invention is also used for mass transfer, that is, the removal of gaseous matter from the gas stream by means of absorption or adsorption. The device, in a broad description, is base upon the reasoning that collisions of gas streams containing entrained liquid is a very efficient means for removing finely divided contaminants. The gas stream may contain either particulate or gaseous material which are both referred to herein as contaminants. Such term also is intended to encompass a combination of particulate and gaseous contaminants.

The major mechanism of particle collection of the device of the present invention is inertial impaction. Inertial impaction refers to the collision of one particle with another particle or with a surface. While the device is configured such that the gas stream flows around a plate, the particles being collected have sufficient inertia such that they are unable to follow the gas stream sufficient to prevent their collision. The use of inertial impaction in the present invention represents an important collection mechanism for particles which are about 0.1 micron in diameter and larger. It is therefore of major importance in the size range which has been designated by the Environmental Protection Agency as the "fine particle" range. The advantage of colliding gas streams is based on the following theory. In the conventional type of gas atomized or pre-atomized scrubbers, the highest relative velocity between the contaminant particles and the collector particles (such as liquid drops) is the velocity of the gas jet relative to the liquid at its point of introduction. The drops in a well designed venturi scrubber will generally attain a velocity which approaches the gas velocity. With the device of the present invention, on the other hand, the relative velocities between the contaminant particles and the collector particles can approach twice the gas jet velocities when they collide.

Because of the high relative velocity between the collector particles and the gas stream containing the contaminants upon collision, the efficiency will be higher then would be possible if the relative velocity were limited by the velocity of a single gas stream. As a further consequence of the increased collision efficiency, the gas phase pressure drop required to obtain a given degree of scrubbing will be less in the device of the present invention than in conventional gas atomized or pre-atomized type scrubbers.

Another aspect of the present invention which is also believed to play an important role in achieving efficient particle collection is the specific configuration of the scrubber. More specifically, in the scrubber of the present invention, liquid is introduced at the periphery of a circular flow passage through which a gas stream containing contaminants is flowing. This permits a uniform introduction of the liquid. The gas stream is then directed radially inward towards a central, essentially circular, opening. Adjacent the opening an impaction zone is created which, is where much of the finely divided contaminants are removed. The gas stream is then directed through the opening into a diffusion zone where further removal and extraction of the contaminants is achieved.

The novel features which are believed to be characteristic of this invention, both as to its organization and method of operation, together with further objectives and advantages thereof will be better understood from the following description considered in connection with accompanying drawings in which a presently preferred embodiment of the invention is illustrated by way of example. It is to be expressly understood, however, that the drawings are for the purpose of illustration and description only, and are not intended as a definition of the limits of the invention.

BRIEF DESCRIPTION OF THE DRAWINGS

FIG. 1 is a perspective view use showing the scrubber device of the present invention;

FIG. 2 is a top cutaway view showing some of the internal aspects of the scrubber device of the present invention; and FIG. 3 is a front cutaway view showing other internal aspects of the scrubber device of the present invention.

DETAILED DESCRIPTION OF THE INVENTION

Referring first to FIGS. 1 and 3 there is shown the scrubber device 10 of the present invention. In the preferred embodiment, device 10 is comprised of a generally cylindrical housing 12 having a pretreatment section or chamber 14, an implosion section or chamber 16 and a diffusion section or chamber 18. A generally cylindrical inlet conduit 20 directs a gas stream containing particulate material into pretreatment section 14. An outlet conduit 22 directs the cleaned gas stream out of the diffusion section 18.

Referring now to FIGS. 2 and 3, one can see that a liquid spray means 24 is disposed in the pretreatment section 14 adjacent the conduit 20. Such spray means 24 may comprise a spray nozzle, multiple pipe, overflow weir or the like. Spray means 24 is usually used to spray water into the incoming gas stream. This can saturate the gas stream thereby causing the water to condense on the suspended particles.

Other pretreatments of the gas stream in section 14 may be utilized to achieve one or more of the following:

1. Cool the gas by contact with water spray;
2. Saturate the gas by addition of vapor, such as steam, or by cooling with water spray, or by cooling with a cold surface (contact);
3. Supersaturate the gas by cooling to a temperature below the saturation temperature;
4. Cause liquid to condense on the particles suspended in the gas, as a consequence of increasing the degree of saturation by methods such as 1, 2 and 3 above;
5. Impart an electrostatic charge into the particles suspended in the gas; and
6. Cause a portion of the suspended particles to be separated from the gas stream by being collected on spray drops or surfaces.

Separating the pretreatment section 14 from the implosion section 16 is a generally circular plate member 28 which has disposed adjacent its periphery a series of weirs 30 or other means to evenly distribute a liquid as hereinbelow described. Plate 28 is suspended in the device 10 by attaching it at various points along its periphery to interior wall 34. In this manner, an annular gas flow passage 32 is created between the wall 34 and the plate 28. Flow guide vanes 36 are also attached along the periphery of the plate 28 and are located between the pretreatment section 14 and implosion section 16. Alternatively, vanes 36 could be located at other locations in pretreatment section 14. Vanes 36 are used to substantially reduce or eliminate any rotational motion (swirling) of the gas stream as it flows into the implosion section 16 from the pretreatment section 14.

The gas velocity is increased as the gas flows through channel or flow passage 40 formed in the implosion section 16 to a suitable magnitude for the atomization of liquid. Flow passage 40 may have its cross-sectional area available for flow decreased by means of ring member 38. This further increases the velocity of the gas stream through flow passage 40. In the preferred embodiment, the gas stream is accelerated to a velocity of 30 to 100 m/sec. Alternatively, the area for flow between the bottom of the liquid distribution plate 28 and lower plate 29 could be reduced by attaching a flow restrictor to the bottom of the plate 28 at the entrance to the flow passage 40, by having restriction pieces attached to both the upper and lower plates 28, 29, by using a sloping section in the entrance region of the flow passage 40, or by other configurations which are all within the scope of this invention. For example, plate 29 could have an inverted cone configuration. Such configuration would help maintain a constant velocity through section 16 which may be desirable under certain conditions.

Depending from the implosion section 16 into the diffusion section 18 is a generally cylindrical throat member 44 preferably located at least one foot from ring member 38. The length of the throat 44 varies, depending on performance requirements, and a typical range may be from 2 to 30 centimeters. A conical diffuser 46 is attached to throat 44 in the preferred embodiment, and should ideally have an angle of expansion of about 7 degrees, but this may be subject to space requirement.

In the preferred embodiment, as the gas exits out of orifice 48, through throat 44 and diffuser 46, and into the diffusion section 18, it is then directed toward entrainment separator means 50. Such type of entrainment separator means 50 is well recognized in the prior art and is used to remove liquid entrained in the gas stream. Some liquid entrainment is also separated from the gas by impingement of the gas stream on a liquid pool 52 formed in the diffusion section 18. An outlet 54 is used to direct liquid out of the scrubber device 10 to recirculate or to a drain.

The operation of the scrubber device 10 of the present invention will now be set forth.

As discussed hereinabove, the gas stream, as generally indicated by arrow 56, is directed into the device 10, and more specifically, into the pretreatment section 14 of housing 12 by generally cylindrical duct or conduit 20. Here, the gas stream may, if desired, be treated with a liquid supplied by spray means 24. Such liquid, preferably water, is carried (entrained) by the gas stream and this entrained liquid aids in collecting particles and absorbing gas. Alternatively, an electrostatic charge may be applied to the gas stream so as to charge the particulate material thereby further encouraging particle agglomeration. Such electrostatic charge means (not shown) are well recognized in the prior art and will not be described in detail herein.

Liquid, preferably water, is also directed onto plate 28 by means of a spray or nozzle means 26. As the water flows across the plate 28, it overflows through weir members 30 and thus creates a waterfall effect into the implosion section 16. It should be understood that plate 28 could have a conical configuration and the water from spray means 26 would be distributed down the sides of the cone. In such an embodiment, the need for weirs 30 may be eliminated. As the gas flows through section 14, it is directed through the annular passage 32 formed between plate 28 and wall 34. This increases the gas velocity. Further increase in velocity is achieved when the gas flow through flow passage 40, and when ring 38 is used even higher velocities can be achieved. Preferably, the gas stream flows through section 16 at a velocity of approximately 30-100 m/sec. Vane members 36 help retard swirling of the gas stream. At this relative velocity between the gas and the liquid, as the liquid flows off plate 29, it becomes atomized into drops and is entrained with the gas.

The region where the liquid is preferably introduced into the accelerated gas is the entrance of the flow passage 40 of the scrubber device 10. In an alternative embodiment, the liquid drops from spray 26 and may also be electrostatically charged if desired. Some particle collection is achieved in flow passage 40.

The gas and liquid continue to flow inward in flow passage 40 along convergent paths, so that eventually there will be an implosion zone generally indicated as implosion zone 42. Here, the liquid and gas collide, which result in the following:

1. Gas and drops approach one another at extremely high relative velocity so the particle collection efficiency of the drops is greatly increased from what it was in the channel 40. Gas absorption rate is also increased by high relative velocity.

2. Drops are atomized into much smaller drops under the influence of high relative velocity and the shattering which occurs when drops collide with one another.

3. The finer drops are more efficient for the collection of particles and the absorption of gases, so there is an increase beyond the scrubbing effect in the flow passage 40. Theoretical considerations indicate that for particle collection by inertial impaction, implosion zone 42 should be more efficient than the flow passage 40 for the collection of very fine particles ($d_{pa} < 1$ $\mu$mA i.e., aerodynamic diameter is less than 1 micron aerodynamic size). Conversely, the flow passage 40 should generally be more efficient than the implosion zone 42 for the collection of larger particles (larger than $d_{pa} \cong 2$ $\mu$mA).

From the implosion section 16, the gas and liquid flow through orifice 48 in a direction which is generally perpendicular to the flow direction in flow passage 40. In the preferred embodiment, the gas is directed through throat 44 whose axis is perpendicular to the flow direction in flow passage 40. It is preferable to cause the gas/liquid flow to slow gradually, as in a flow diffuser, such as in diffusing element 46, in order to minimize the gas phase pressure drop through the scrubber 10.

Additional particle collection from the gas occurs in the diffusion section 18 of the scrubber 10 where the gas velocity is preferably reduced to about 15 m/sec. The lower velocity and resultant longer residence time in the diffusion section 18 permits diffusional processes, such as particle collection by Brownian diffusion and electrostatic deposition, and also gas absorption, to be more effective. The especially small drops formed in the implosion zone 42 also aid in these diffusional processes.

In the diffusion section 18, and prior to entrance into entrainment separator means 50 there may be a more or less extensive volume which is referred to as a "fog zone". In the fog zone, there is additional time for diffusional processes and an opportunity for some separation of liquid entrainment. In the entrainment separator means 50, liquid is separated from the gas by some form of inertial impaction and/or centrifugal deposition. The gas velocity to the entrainment separator means 50 will generally be in the range of 3 to 8 m/sec., depending on the type of separator. From the entrainment separator means 50, the gas flows through outlet 22. The collected liquid flows to one or more of the following places: either out of the scrubber 10, to a liquid reservoir within the scrubber 16, or back to a liquid injection system within the scrubber 10, upstream of channel 40.

While the above described invention has been directed to a generally downward flow of gas, the device could readily use an upward flow of gas. For upward flow of gas, the device then would be rotated 180 degrees from a horizontal axis and the means for liquid introduction and entrainment separation would be suitably modified. The apparatus could also be operated with the gas flow in a generally horizontal direction both in and out of the scrubber 10, by making changes in the means of introducing and removal of the liquid which is readily apparent to one of ordinary skill in the art. Alternate designs could also involve the use of two particle diffusers, a radial flow diffuser, or systems which use only the radial inward flow channel or throat and implosion principle without the use of an outlet diffuser. This invention, therefore, is not to be limited to the specific embodiments described and disclosed herein.

I claim:

1. A scrubber device for removing finely divided contaminants from a gas stream, comprising:
   a housing comprising a pretreatment section, an implosion section, and a diffusion section, all said sections in series flow communication with each other;
   an inlet conduit joined to said housing for directing a gas stream into said pretreatment section;
   a first plate disposed in said housing between said pretreatment section and said implosion section, wherein said first plate forms an annular flow passage for said gas stream from said pretreatment section into said implosion section and further wherein said first plate forms part of said implosion section;
   means disposed in said housing for supplying a liquid to said gas stream in said pretreatment section such that finely divided liquid particles are entrained in said gas stream;
   a second plate disposed in said housing adjacent said first plate, said first and second plates defining said implosion section and configured such that as said gas stream flows into said implosion section from said annular passage, it is directed radially inward and impacts upon itself in a defined area between said plates thereby encouraging said finely divided contaminants to be removed from said gas stream by intertial impaction;
   said diffusion section constructed and arranged to received said gas stream from said implosion section and including means for removing said finely divided liquid particles; and
   an outlet conduit joined to said housing for directing the now cleaned gas stream out of said diffusion section.

2. A scrubber device according to claim 1 wherein said housing has a generally cylindrical configuration.

3. A scrubber device according to claim 1 wherein said first and second plates comprise spaced parallel planar surfaces.

4. A scrubber device according to claim 3 wherein said first plate includes means for directing liquid into said gas stream.

5. A scrubber device according to claim 1 further including means for preventing said gas stream from swirling, said preventing means disposed in said housing adjacent said pretreatment section.

6. A scrubber device according to claim 5 wherein said preventing means comprise flow vanes disposed in said housing adjacent said annular flow passage.

7. A scrubber device according to claim 1 further including a depending throat member disposed in said housing adjacent said diffusion section for directing the gas stream from said implosion section into said diffusion section.

8. A scrubber device according to claim 1 further including means for limiting the area for gas stream flow in said implosion section, said limiting means disposed in said housing in said implosion section.

9. A scrubber device according to claim 8 wherein said limiting means comprises a ring.

10. A scrubber device according to claim 1 wherein said means for removing said finely divided liquid particles includes a liquid pool disposed in said diffusion section.

11. A scrubber device according to claim 1 further including a pool of liquid in said diffusion chamber.

12. A scrubber device according to claim 1 further including a second liquid supply means disposed in said housing for supplying a liquid spray to said pretreatment section.

13. A scrubber for removing finely divided contaminants from a gas stream, comprising:
   a pretreatment chamber having gas inlet means, a diffusion chamber having gas outlet means and an implosion chamber disposed therebetween and in flow communication therewith;
   a first plate disposed between said pretreatment chamber and said implosion chamber wherein said first plate forms an annular flow passage for said gas stream from said pretreatment chamber into said implosion chamber, and further wherein said first plate forms part of said implosion chamber;
   means for supplying a liquid to said gas stream located in said device such that as said gas stream passes from said pretreatment chamber to said implosion chamber, finely divided liquid particles are entrained in said gas stream;
   a second plate disposed in said housing and separated from said first plate, said first and second plates defining said implosion chamber and configured such that as said gas stream and entrained liquid particles flow into said implosion chamber from said annular flow passage, they are directed radially inward and impact upon themselves in a defined area between said plates thereby encouraging said finely divided contaminants to be removed from said gas stream;

a throat member joined to said implosion chamber and extending into said diffusion chamber, said throat member configured to direct said gas stream from said implosion chamber to said diffusion chamber; and means, disposed in said diffusion chamber, for removing said finely divided liquid particles from said gas stream.

14. A scrubber device according to claim 13 further including a second liquid supply means disposed in said pretreatment chamber.

15. A scrubber device according to claims 13 or 14 further including flow guides disposed in said housing adjacent said annular passage, said flow guides constructed and arranged to prevent said gas stream from swirling as it flows into said implosion chamber.

16. A scrubber device according to claim 13 further including means for limiting the area for flow between said annular passage and said throat member, said limiting means disposed in said housing in said implosion section.

17. A scrubber device according to claim 13 wherein said throat member is connected to an axial opening in said second plate.

18. A scrubber device according to claim 13 wherein said removing means comprises an entrainment separator disposed in said diffusion chamber.

19. A scrubber device according to claim 12 wherein said first plate has a rim such that liquid can collect on said first plate.

20. A scrubber device according to claim 19 wherein said rim comprises flow channels for said liquid whereby said liquid collects on said first plate and flows into said annular flow passage.

21. A method for removing finely divided contaminants from a gas stream comprising the steps of:
  (a) providing a housing having a pretreatment chamber having gas inlet means, a diffusion chamber having gas outlet means and an implosion chamber disposed therebetween and in flow communication therewith, said housing further having a flat plate disposed in said housing defining an annular flow passage from said pretreatment chamber to said implosion chamber;
  (b) directing a stream of gas containing contaminants through said pretreatment chamber such that it impinges on said plate;
  (c) providing said stream of gas with finely divided liquid drops such that said drops are entrained therein;
  (d) directing said gas stream and entrained liquid drops through said annular flow passage and then into said implosion chamber in a radially inward direction causing said gas stream and liquid drops to impact upon themselves whereby at least some of said contaminants are removed by inertial impaction and interception;
  (e) directing said gas stream into said diffusion chamber where the velocity of the gas stream is decreased;
  (f) removing additional liquid drops and contaminants from said gas stream; and
  (g) directing a substantially cleaned gas stream out of said housing.

* * * * *